US005921283A

United States Patent [19]

Alvern

[11] Patent Number: 5,921,283

[45] Date of Patent: Jul. 13, 1999

[54] PROTECTIVE COVER FOR A FUEL PUMP FILLER GUN AND METHOD FOR PROTECTING SAME

[75] Inventor: Öyvind Alvern, Hjellestad, Norway

[73] Assignee: Alvern-Norway A/S, Norway

[21] Appl. No.: 08/723,762

[22] Filed: Sep. 30, 1996

Related U.S. Application Data

[63] Continuation-in-part of application No. 08/678,848, Jul. 12, 1996, which is a continuation-in-part of application No. 08/669,228, Jun. 24, 1996.

[51] Int. Cl.$^6$ .......... F16L 57/00

[52] U.S. Cl. .......... 138/110; 138/120; 138/155; 138/157; 141/392

[58] Field of Search .......... 138/110, 108, 138/155, 157, 120; 141/97, 392; 137/377; 222/566

[56] References Cited

U.S. PATENT DOCUMENTS

| | | | |
|---|---|---|---|
| D. 173,007 | 9/1954 | Anderson . | |
| 980,890 | 1/1911 | Edwards . | |
| 1,733,262 | 10/1929 | Higby . | |
| 2,236,208 | 3/1941 | Creel . | |
| 2,643,668 | 6/1953 | Ackermann . | |
| 2,800,931 | 7/1957 | Sutcliffe . | |
| 3,474,837 | 10/1969 | Carder et al. . | |
| 3,566,928 | 3/1971 | Hansel . | |
| 3,578,026 | 5/1971 | Meyer, Jr. | 138/110 |
| 3,732,894 | 5/1973 | Botsolas | 138/110 |
| 4,180,102 | 12/1979 | Larkin | 138/110 |
| 4,383,565 | 5/1983 | Denmat . | |
| 4,465,209 | 8/1984 | Wilder . | |
| 4,484,785 | 11/1984 | Jackson | 138/110 |
| 4,553,308 | 11/1985 | Botsolas | 138/157 |
| 4,830,060 | 5/1989 | Botsolas | 138/110 |
| 4,838,318 | 6/1989 | Karakawa | 138/110 |
| 4,889,167 | 12/1989 | Morris | 138/110 |
| 4,951,716 | 8/1990 | Tsunoda et al. | 138/157 |
| 5,184,655 | 2/1993 | Fell . | |
| 5,203,522 | 4/1993 | White et al. | 138/110 |
| 5,332,156 | 7/1994 | Wheeler . | |

FOREIGN PATENT DOCUMENTS

| | | |
|---|---|---|
| 0 608 596A1 | 3/1994 | European Pat. Off. . |
| WO94/04457 | 3/1994 | WIPO . |
| WO97/19015 | 5/1997 | WIPO . |

*Primary Examiner*—Patrick Brinson
*Assistant Examiner*—James F. Hook
*Attorney, Agent, or Firm*—Finnegan, Henderson, Farabow, Garrett & Dunner, L.L.P.

[57] ABSTRACT

A protective apparatus for use with a fuel pump filler gun having in sequence a barrel, a head, and a handle, includes a protective body. The protective body has an outer shell surrounding at least a portion of the filler gun. The outer shell is hard in order to resist scratching, absorb the initial impact, and distribute the forces. The protective body further has a plurality of energy-absorbing pads distributed around an inner surface of the outer shell. The protective apparatus further includes means for attaching the protective body to the filler gun or to a boot covering a portion of the filler gun.

15 Claims, 20 Drawing Sheets

PROTECTIVE COVER FOR A FUEL PUMP FILLER GUN AND METHOD FOR PROTECTING SAME

This application is a continuation-in-part of U.S. patent application Ser. No. 08/678,848 filed Jul. 12, 1996, which is a continuation-in-part of U.S. patent application Ser. No. 08/669,228 filed Jun. 24, 1996.

BACKGROUND OF THE INVENTION

1. Field of the Invention

The present invention relates to protection devices, and more particularly to a protection apparatus having a hard outer shell and a plurality of energy-absorbing pads disposed on an inner surface thereof, attachable to a fuel pump filler gun. The protection apparatus absorbs and distributes impact forces otherwise received directly by the filler gun when dropped or hit against an object.

2. Description of the Related Art

Related art devices are known to have the head of a filler gun of a fuel pump covered by a thin boot of rubber or plastic material. The boot prevents a bare filler gun head from making scratches on a car's paint, and to a limited degree protects the head from damage. Even with a boot covering the head, however, impact forces caused by the filler guns being dropped upon the ground, or being hit against the gas pump, automobiles, and other objects, result in damaged filler guns. Repairing and replacing filler guns are one of the direct costs of such damage. The gas station operator also may lose business as a result of having certain pumps out of order while awaiting repair.

A need exists for a protection apparatus which may be readily attached to all configurations of filler guns, whether or not the filler gun has a boot covering the head. The protection apparatus should be readily attachable to the head of a filler gun, or to a boot covering the head of a filler gun, to provide significant protection to the filler gun, thereby avoiding the costs associated with pump downtime, and filler gun repair and replacement.

SUMMARY OF THE INVENTION

Accordingly, the present invention is directed to a protection apparatus that overcomes the limitations and disadvantages of the related art.

An advantage of the present invention is; its simple design that is nevertheless capable of providing a protection apparatus that may be readily attached to all existing configurations of filler guns for protection from damage otherwise resulting from impact forces.

Additional features and advantages of the invention will be set forth in the description which follows, and in part will be apparent from the description, or may be learned by practice of the invention. The objects and other advantages of the invention will be realized and attained by the protection apparatus particularly pointed out in the written description and claims hereof as well as the appended drawings.

To achieve these and other advantages in accordance with the purposes of the invention, as embodied and broadly described, the invention comprises an outer shell surrounding at least a portion of the filler gun to distribute impact forces away from the filler gun. The outer shell includes a plurality of energy-absorbing pads on an inner surface thereof. The outer shell is hard, to resist scratching, absorb the initial impact, and distribute the forces over the pads. The invention preferably includes attachment means for attaching the outer shell to the filler gun.

In one embodiment, the protective apparatus is configured for use with a filler gun having a boot covering at least a portion of the head. In this embodiment, the attachment means preferably attaches the protective apparatus to the boot. However, the invention is not limited to use only with filler guns protected by a boot. The protective apparatus of the present invention permits attachment either to the head of a filler gun, or to a boot covering the head of the filler gun.

The outer shell may be formed from various materials, and the attachment means can be any substance or device for securing the protective body to the filler gun. Preferably, the outer shell is made of molded plastic or a substantially hard plastic. The preferred hard plastic is either polyamide, or polycarbonate. PBT. The preferred energy-absorbing pads are selected from at least one of soft plastic or rubber. The attachment means may include straps, adhesives, anchors and screws, pins, or hooks. When used with a boot, one preferred attachment means includes pins having a hooked head for penetrating the boot. Another preferred attachment means is a strap. A preferred attachment means utilized with either a bare head or head covered with a boot may be integrally formed into the outer shell.

In yet another embodiment, the protective body has a first body portion and a second body portion connected together. The attachment means includes a first member connected to the first body portion and a second member connected to the second body portion. The first member releasably engages with the second member to secure the protective body to the filler gun. The preferred first member is formed as a male element in the form of snap hooks, and the second member is formed as a female element having means for receiving and releasably engaging the hooks.

According to another embodiment, the protective body is divided into at least two parts configured to cover impact points on the filler gun or extend above the impact points. The filler gun impact points are first to contact when the filler gun is dropped at various angles.

In another alternative, the protective body adapts to be fitted onto a fuel pump filler gun and extends over at least a portion of the head of the filler gun. In this embodiment, the outer shell is divided into a first member and a second member. Means for releasably interconnecting the first and second members are shaped to generally conform, when so interconnected, to enclose the sides, bottom, and the upper portions of the head of the filler gun.

Alternatively, the protective body may include a lower member and an upper member for releasably engaging with the lower member. The lower member has two side panels and means for interconnecting the side panels. The lower member, when the two side panels are brought to lie against the head of the filler gun, substantially fit around a lower part of the head The side panels have at a top region thereof first interlocking means. The upper member is formed to fit over an upper part of the head of the filler gun, and has second interlocking means for releasable engaging the first interlocking means on the lower member. Preferably, the two side panels are integrally joined at a front region thereof. The preferred front region is above and below a front opening in the lower member through which the barrel extends. A preferred interconnecting means includes snap-locks. Another preferred interconnecting means is a bottom element attached to the panels by hinges. The panels, bottom element, first interlocking means, and lower member preferably are formed as an integral structure.

It is to be understood that both the foregoing general description and the following detailed descriptions are exemplary only, and are not restrictive of the invention.

BRIEF DESCRIPTION OF THE DRAWINGS

The accompanying drawings are included to provide a further understanding of the invention and are incorporated in and constitute a part of the specification. The drawings illustrate several embodiments of the invention and together with the description, serve to explain the principals of the invention. In the drawings.

A DESCRIPTION OF THE PREFERRED EMBODIMENTS

Reference will now be made in detail to the present preferred embodiments of the invention, examples of which are illustrated in the accompanying drawings.

Figure 1:
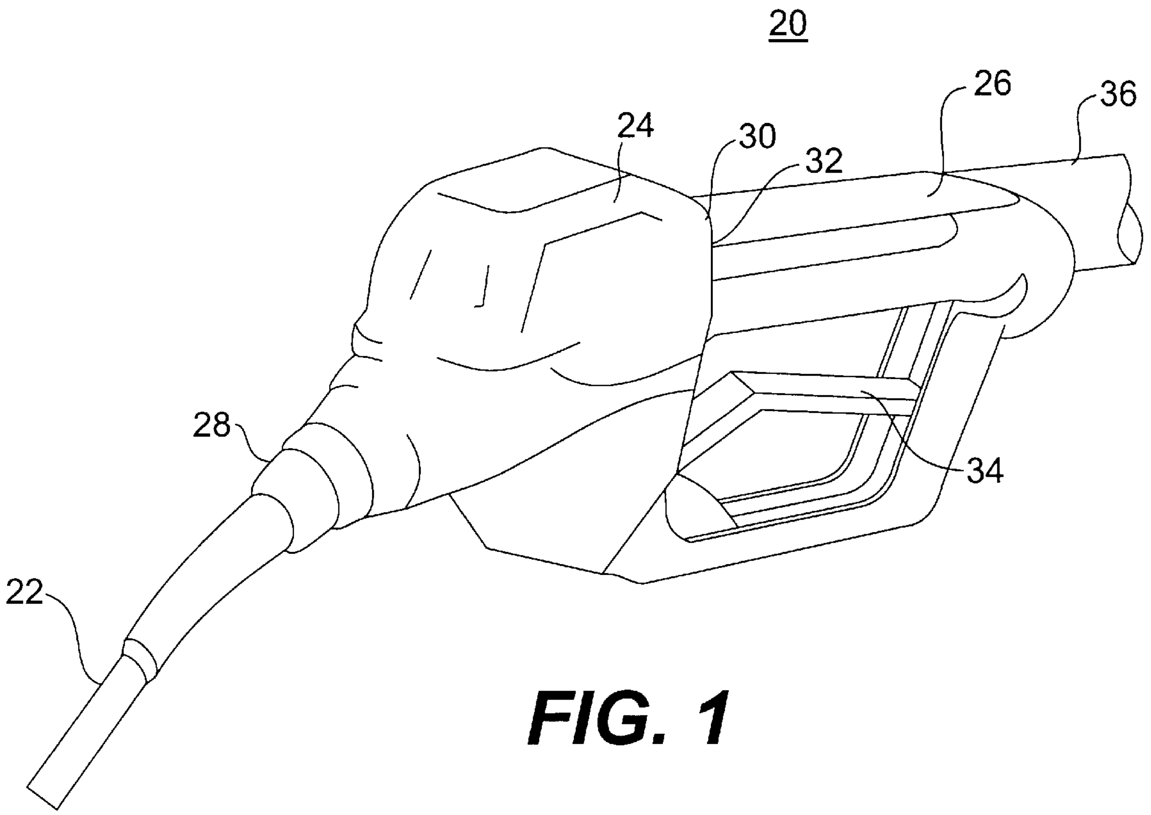
FIG. 1 is a perspective view of a conventional filler gun.

By way of background, a conventional fuel pump filler gun for discharging fuel is illustrated in FIG. 1, designated generally by the reference numeral 20. As shown in FIG. 1, the fuel pump filler gun 20 includes a barrel 22, a gun head 24, and a handle 26. The head 24 has a front end 28 where it joins at a junction with the barrel 22, and a rear end 30. The handle 26 has a front end 32 which joins at a junction with the rear end 30 of the head 24. The handle 26 has a lever 34 which is operatively connected to an internally located valve to control the flow of fuel from a fuel hose 36. The head 24 may be unprotected, or it may be covered by a boot 24' of rubber or plastic material.

A protective apparatus attachable to a fuel pump filler gun according to the present invention comprises a protective body having an outer layer surrounding an energy absorbing inner layer.

An exemplary embodiment of the protective apparatus of the present invention is shown in FIGS. 2–5 and designated generally by reference numeral 38.

As broadly embodied herein, and referring to FIGS. 2–5, the invention comprises an energy absorbing inner layer 40 surrounding a portion of the filler gun 20 to protect the filler gun 20 from impact forces. An outer layer 42 surrounds at least a portion of the inner layer 40 to distribute impact forces over the inner layer 40. The outer layer 42 is harder than the inner layer 40 so as to resist scratching, absorb the initial impact, and distribute the forces over the softer inner layer 40.

The invention preferably includes attachment means for attaching the inner and outer layers 40, 42 to the filler gun 20. The attachment means may include straps, adhesives, anchors and screws, pins, or hooks. These attachment means may be used to connect multiple parts of the protective apparatus together to surround a portion of the filler gun 20, or to secure the protective apparatus to the filler gun by, for example, pushing pins contained within the protection apparatus into a boot 24' covering a head 24. A preferred attachment means utilized with either a bare head or head covered with a boot may be integrally formed into one or both of the inner and outer layers.

In one embodiment, the protective apparatus 38 is configured for use with a filler gun 20 having a boot 24' covering at least a portion of the head 24. In this embodiment, the attachment means preferably attaches the protective apparatus 38 to the boot 24'. However, the invention is not limited to use only with filler guns 20 protected by a boot 24'. The protective apparatus 38 of the present invention permits attachment either to the head 24 of a filler gun 20, or to a boot 24' covering the head 24 of the filler gun 20.

The inner and outer layers 40, 42 form a protective body 44, which may be formed from various materials, and the attachment means can be any substance or device for securing the protective body 44 to the filler gun 20.

Preferably, the outer layer 42 is made of molded plastic or a substantially hard plastic. The preferred hard plastic is either polyamide or polycarbonate. Suitably, the polycarbonate could be e.g. of the make LEXAN®, MAKROLON®, GRILIAMID® or other suitable make. The outer layer 42 is configured to withstand the initial impact and to distribute the impact forces over the softer inner layer 40.

A preferred inner layer 40 is selected from at least one of rubber, foam, plastic, a bladder containing liquid, and a bladder containing gas. These materials absorb the impact forces transferred from the outer layer 40, thereby protecting the filler gun 20 from damage. For an embodiment having a bladder containing liquid, the preferred liquid would not freeze at low temperatures encountered in the region of installation. For an embodiment having a bladder containing gas, the preferred gas is air due to it being inexpensive, safe, and readily accessible at most service stations. In either embodiment having a bladder, a valve for adding or releasing the liquid or gas is preferably included. The bladder design also permits the protection apparatus to readily mold to or fit around various designs of filler guns 20.

Figure 6:
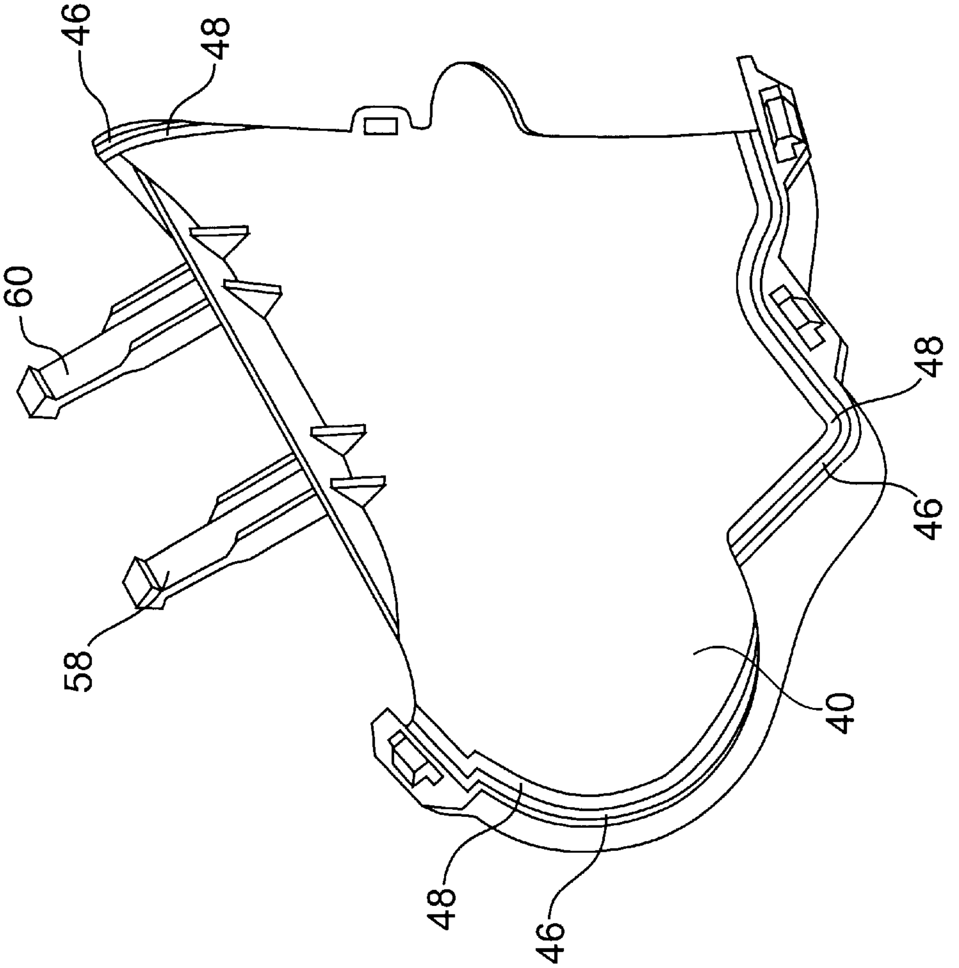
FIG. 6 is a perspective inside view of a side of a lower member according to another embodiment of the invention.

In an alternative embodiment shown in FIG. 6, the inner layer 40 includes at least two layers 46, 48 each selected from one of the above preferred materials. In this alternative embodiment the preferred two layers 46, 48 of the inner layer 40 are made of different materials.

Figure 2:
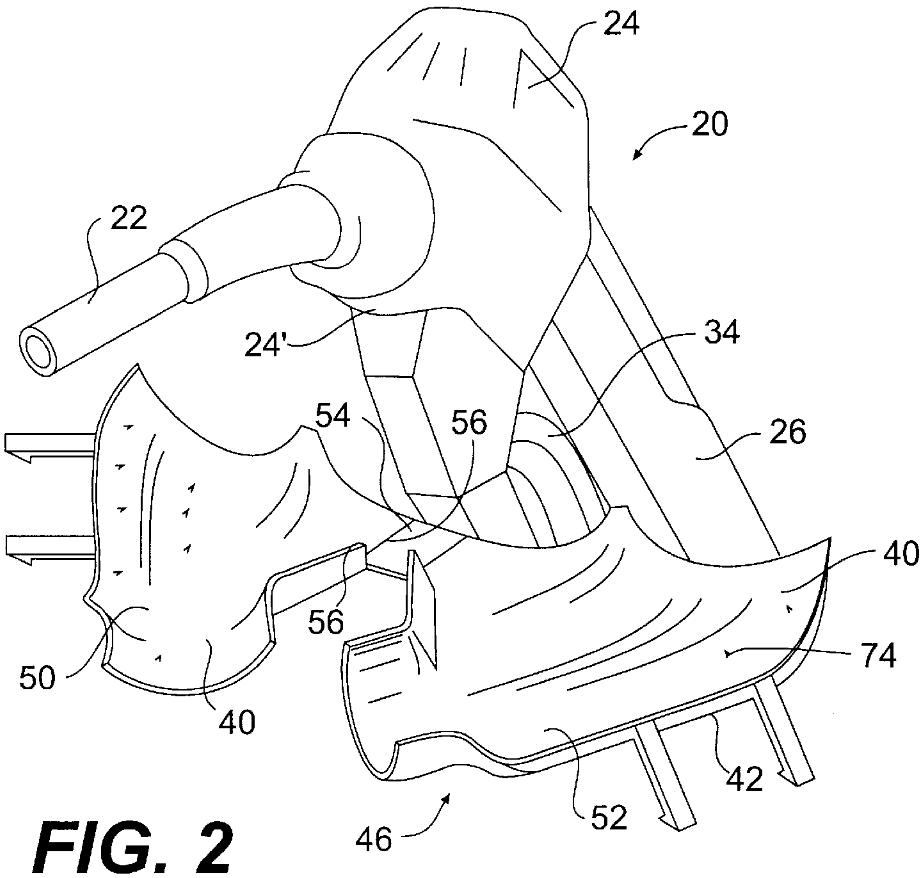
FIGS. 2 and 3 are perspective views of fitting a lower member of a protective body of a protective apparatus onto a filler gun according to one embodiment of the invention.
Figure 3:
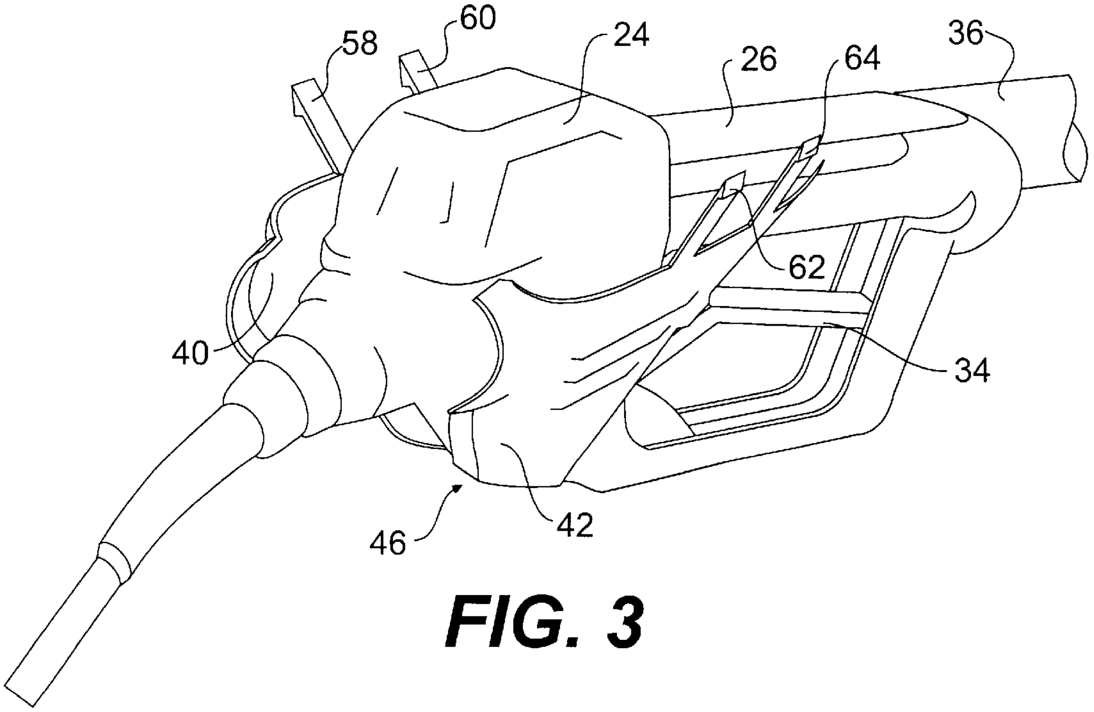

As shown in FIGS. 2–5, the protective apparatus 38 comprises a lower member 46 and an upper member 48 releasably engageable with the lower member 46. The lower member 46 has two side panels 50, 52, a bottom element 54 and device, such as film hinges 56 or the like, integrally connecting side panels 50, 52 with the bottom element 54. As shown in FIG. 3, the lower member 46 with its side panels 50, 52 and bottom element 54 are brought to lie against the gun head 24 substantially fitting around a lower part of the gun head 24. At the top region of the side panels 50, 52 there are first interlocking elements 58, 60 and 62, 64 on the respective panels 50 and 52. The first interlocking elements 58, 60, 62, 64 are suitably formed as male elements in the form of snap hooks.

Figure 4:
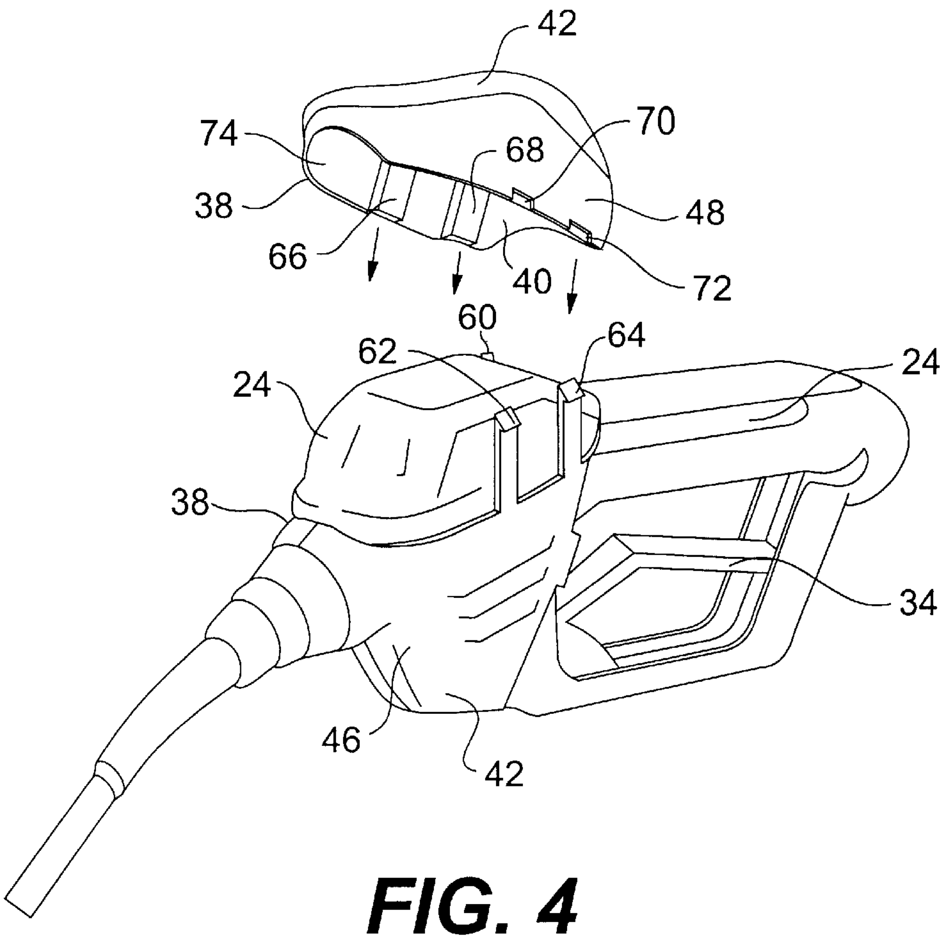
FIG. 4 is a perspective view of fitting fin upper member of the protective body onto the filler gun through engagement with the lower member of FIGS. 2 and 3.
Figure 5:
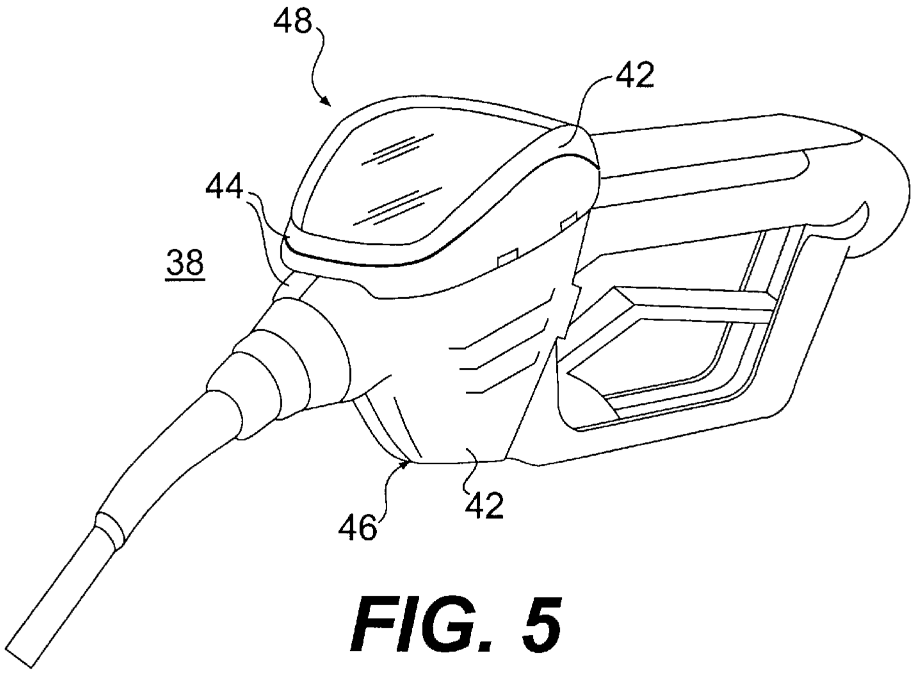
FIG. 5 is a perspective view of the protective body of FIGS. 2–4 fully installed on the filler gun.

As shown in FIG. 4, the upper member 48 is formed as a cap to fit over an upper part of the gun head 24. The upper member 48 has second interlocking elements 66, 68 ard 70, 72 for releasably engaging the first interlocking elements 58, 60 and 62, 64, respectively, on the lower member 46. The second interlocking elements 66, 68, 70, 72 are formed as female elements having a ledge or set-off. FIG. 2 shows that the panels 50, 52, bottom element 54, hinge 6, and first interlocking elements 58, 60, 62, 64 are formed as an integrally made structure, e.g. through an injection molding process.

As illustrated in FIGS. 2 and 3, side panels 50, 52 may be provided with a plurality of integrally made studs 74, which are both for compensating for any tolerances in the space between the panels 50, 52 and the gun head 24 as well as being able to penetrate partly into any boot 24' provided on the gun head 24. Thus, when fitted around the gun head 24, the lower member 46 may obtain an improved contact with the gun head 24. Similarly, as shown in FIG. 4, the upper member 48 may have similar or technically equivalent space compensating studs 74. The studs should be so dimensioned that they will easily yield and/or penetrate into the soft boot 24' covering the gun head 24 if so provided.

Figure 8:
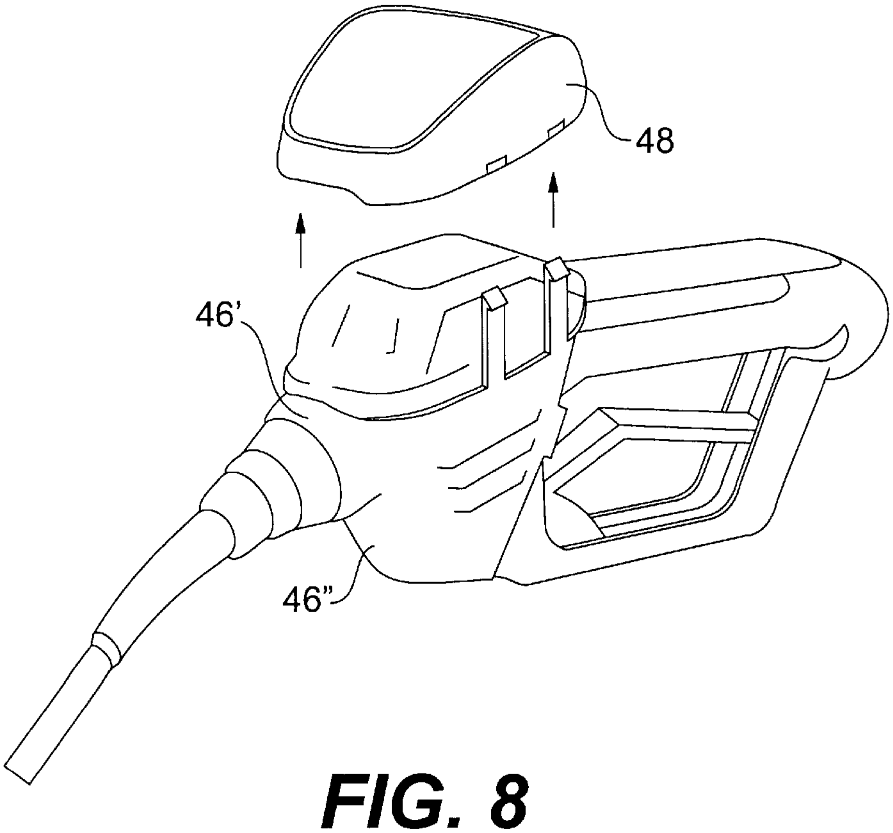
Figure 9:
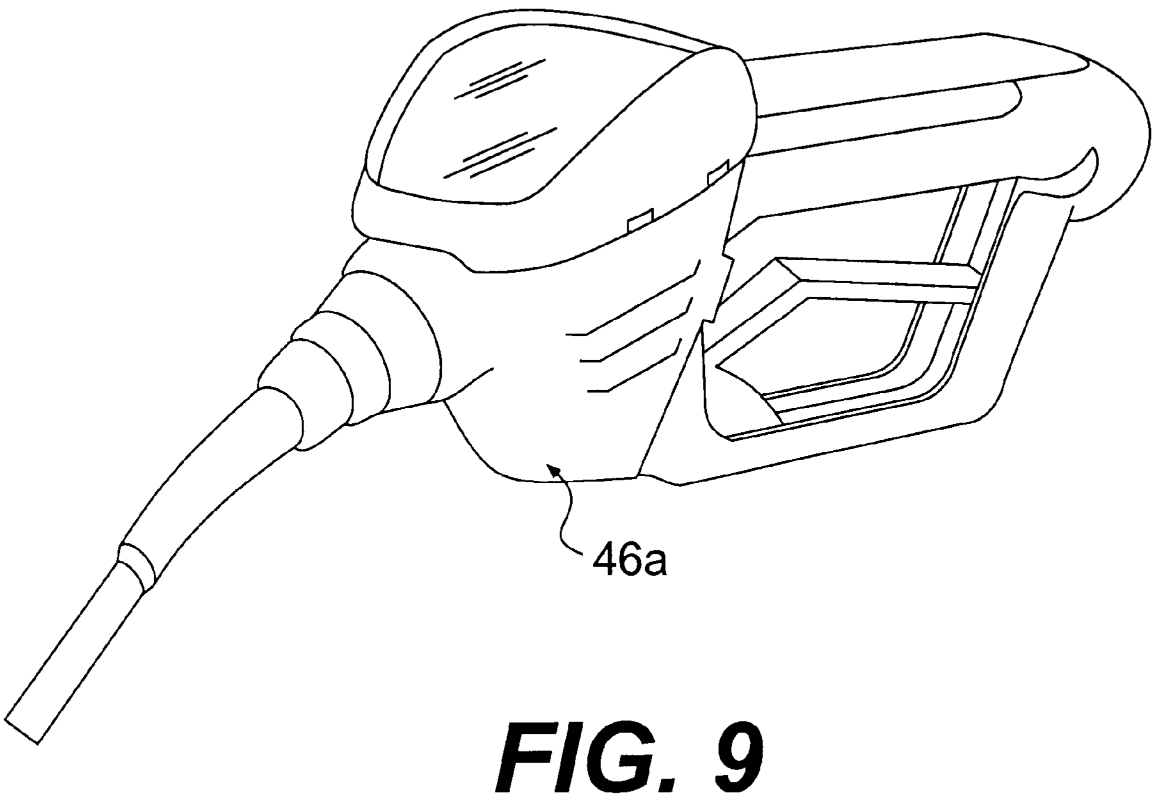

In connection with the description of FIGS. 2 and 3, it should be noted that the side panels 50, 52 at the front region have edges which mate when the panels are brought to lie against the gun head 24. Until such mating occurs, the edges are spaced apart. However, in a modified embodiment of the lower member 46, denoted by reference numeral 46*a* in FIGS. 7–9, the two side panels 50, 52 may be integrally joined at a front region thereof. Suitably, the front region of the two side panels lies above, as indicated by reference number 46', and below, as indicated by reference number 46'' a front opening 46''' , in the lower member 46*a*, through which the barrel 22 extends when the lower member 46*a* is brought into engagement with the gun head 24 on the filler gun 20, as illustrated in FIG. 7.

When the lower member 46*a* is to be fitted onto gun head 24 of filler gun 20, the rear portions of the side panels 50, 52 may be pushed slightly away from each other to more easily push and enter the lower member 46*a* onto the filler gun 20. Although the outer layer 42 of the lower member 46*a* is made of a substantially hard plastic material, the inner and outer layers 40, 42 of the lower member 46*a* may be designed such that the manipulation of the side panels is possible.

Figure 7:
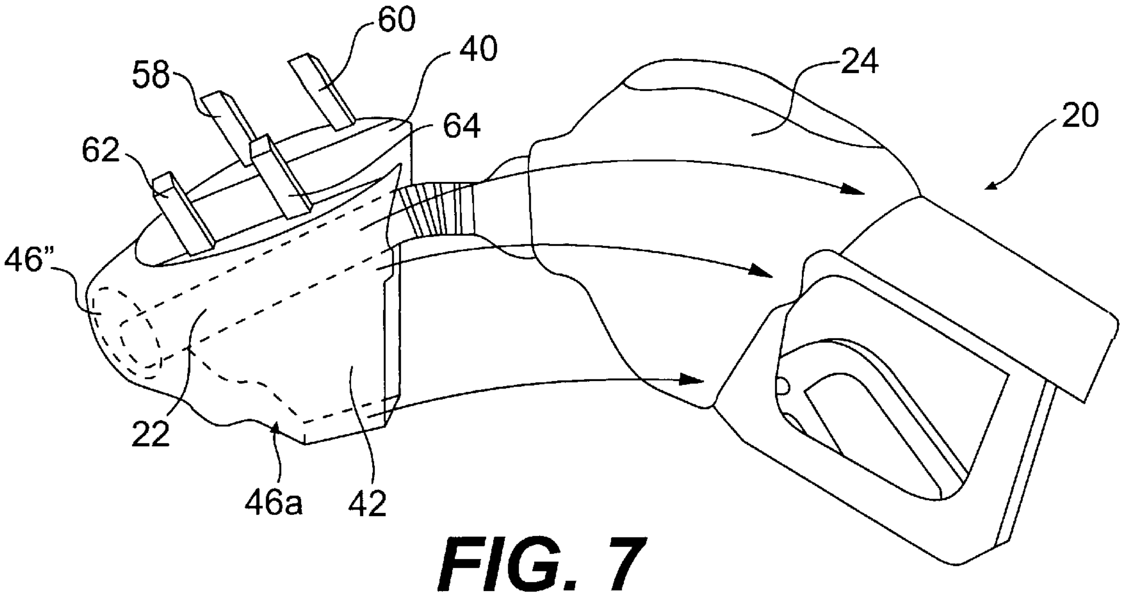
FIGS. 7–9 are perspective views of fitting of the lower member of the protective body onto the filler gun when the lower member at its front end region has its side panels integrally joined according to another embodiment of the invention.
Figure 10:
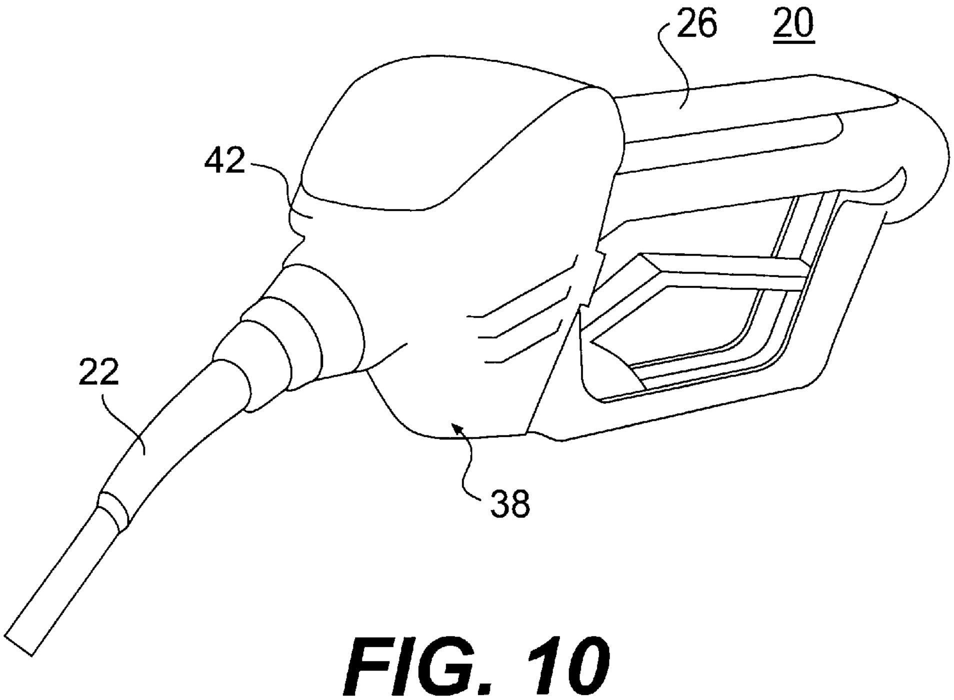
FIG. 10 is a perspective view of a protective apparatus slidably engaged with a filler gun or a boot according to yet another embodiment of the invention.

As broadly embodied herein, and referring to FIG. 10, an alternative embodiment includes a protective sleeve to slidably engage a filler gun 20 in a similar manner to lower member 46*a* FIG. 7. The invention includes an energy absorbing inner layer 40, adapted to slidably engage the head 24, having two respective ends, one end to receive the barrel 22 and the other end to receive the handle 26. An outer layer 42 surrounds at least a portion of the inner layer 40 to distribute impact forces over the inner layer 40.

Figure 11:
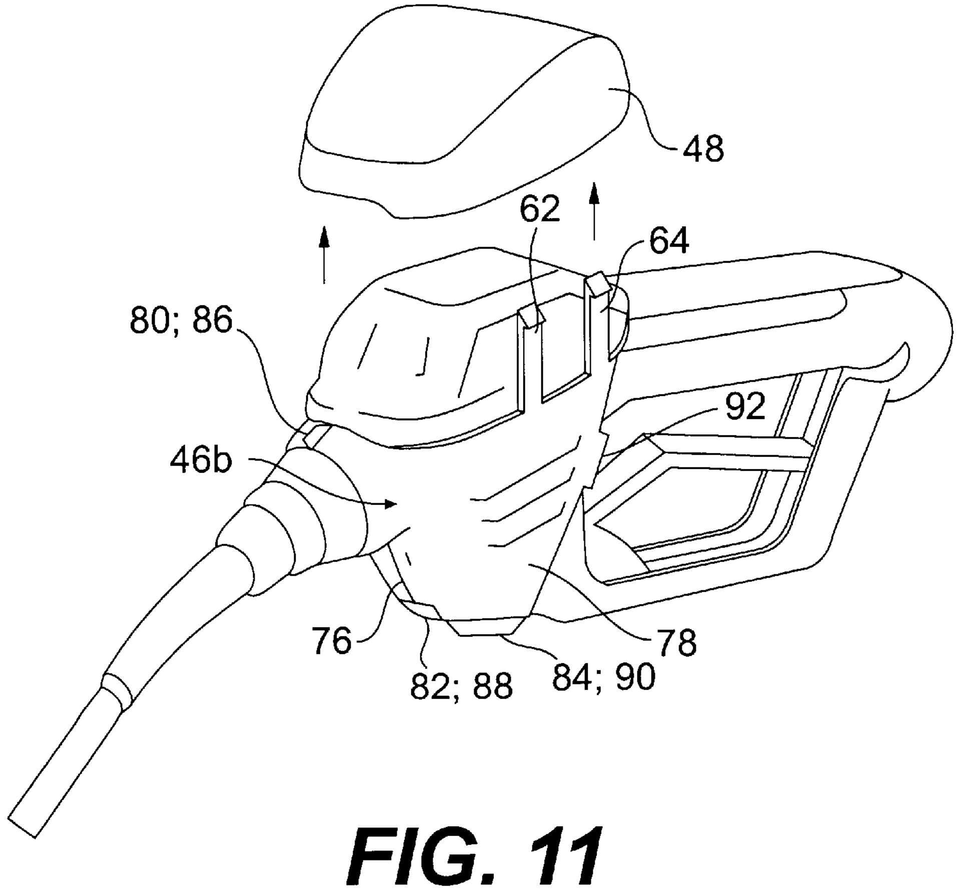
FIG. 11 is a perspective view of separates side panels of the lower member of the protective apparatus according to yet another embodiment of the invention.

The lower member 46*b* (see FIG. 11) of the protective apparatus 38, in its further modified version, comprises two side panels 76 and 78. Side panel 76 has a number of first interconnecting elements 80, 82, and 84. The number of such elements could possibly be fewer, e.g. two or be higher, for example, four. Side panel 78 has corresponding second interconnecting elements 86, 88, and 90. The first interconnecting elements 80, 82, and 84 are suitably male snap-locks. The second interconnecting elements 86, 88, and 90 are suitably female snap-locks. Apertures (not shown) may be provided next to the respective interconnecting elements for inserting conventional self-locking straps in case any of the snap-locks become defective. At the rear region of the lower member, additional apertures (not shown) may be provided for engagement with conventional self-locking straps, if so required. Rear transversely protruding members 92 are intended for engaging a rear edge region of the gun head 24.

Figure 12:
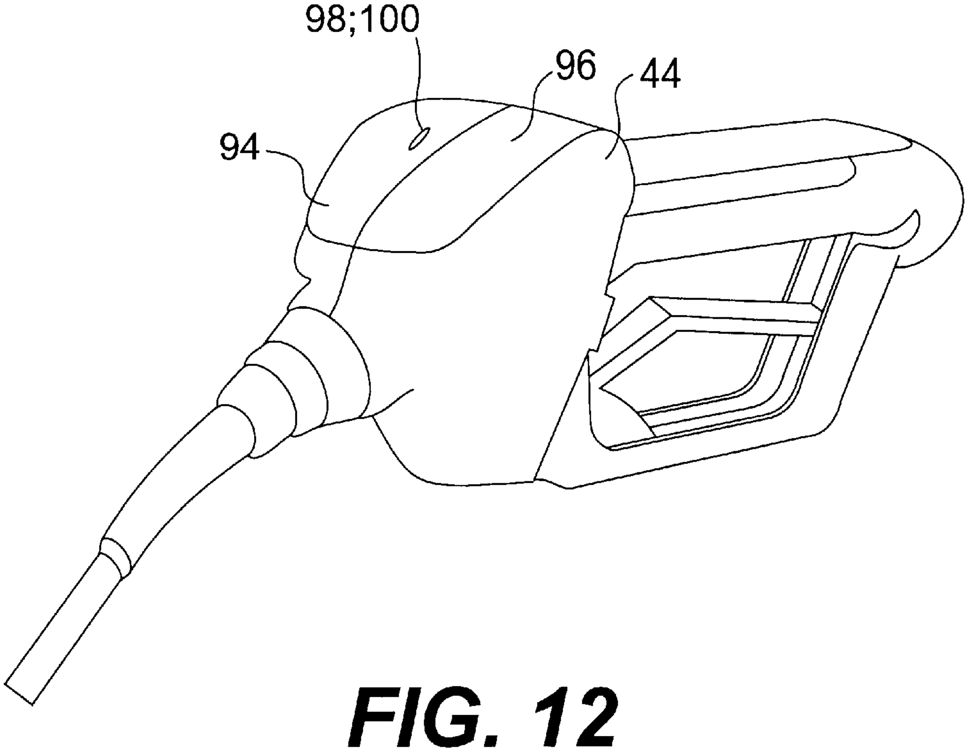
FIG. 12 is a perspective view of a protective apparatus attached to a filler gun or a boot according to yet another embodiment of the invention.

In yet another embodiment, and referring to FIG. 12, the protective body 44 has a first body portion 94 and a second body portion 96 hingedly connected together. The attachment means include a first member 98 connected to the first body portion 94 and a second member 100 connected to the second body portion 96. The first member 98 releasably engages the second member 100 to secure the protective body 44 to the filler gun 20.

Figure 13:
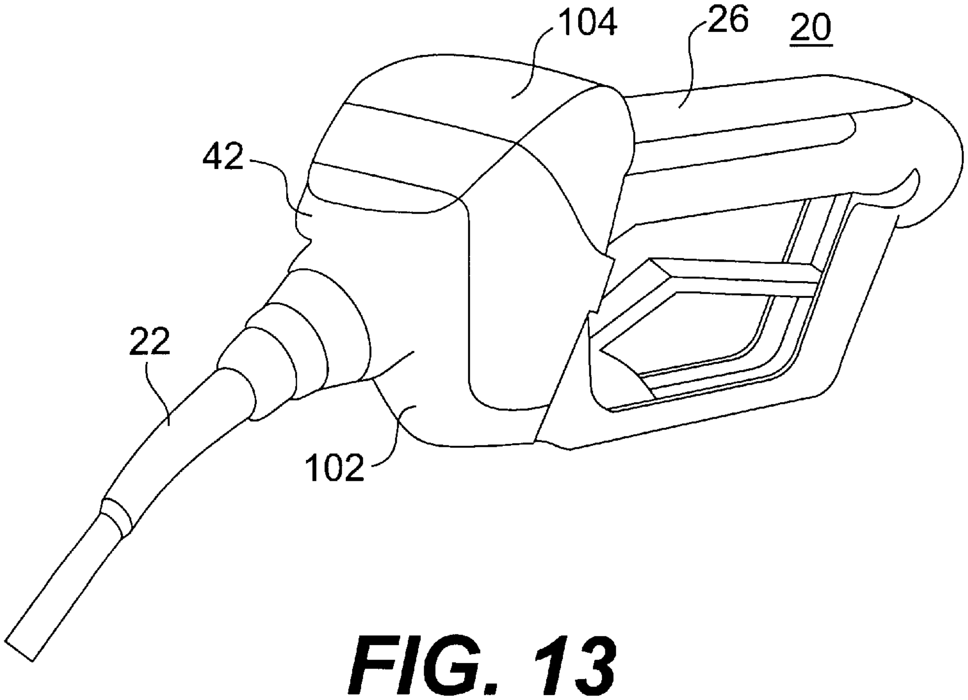
FIG. 13 is a perspective view of a protective apparatus attached to a filler gun or a boot according to another embodiment of the invention.
Figure 14:
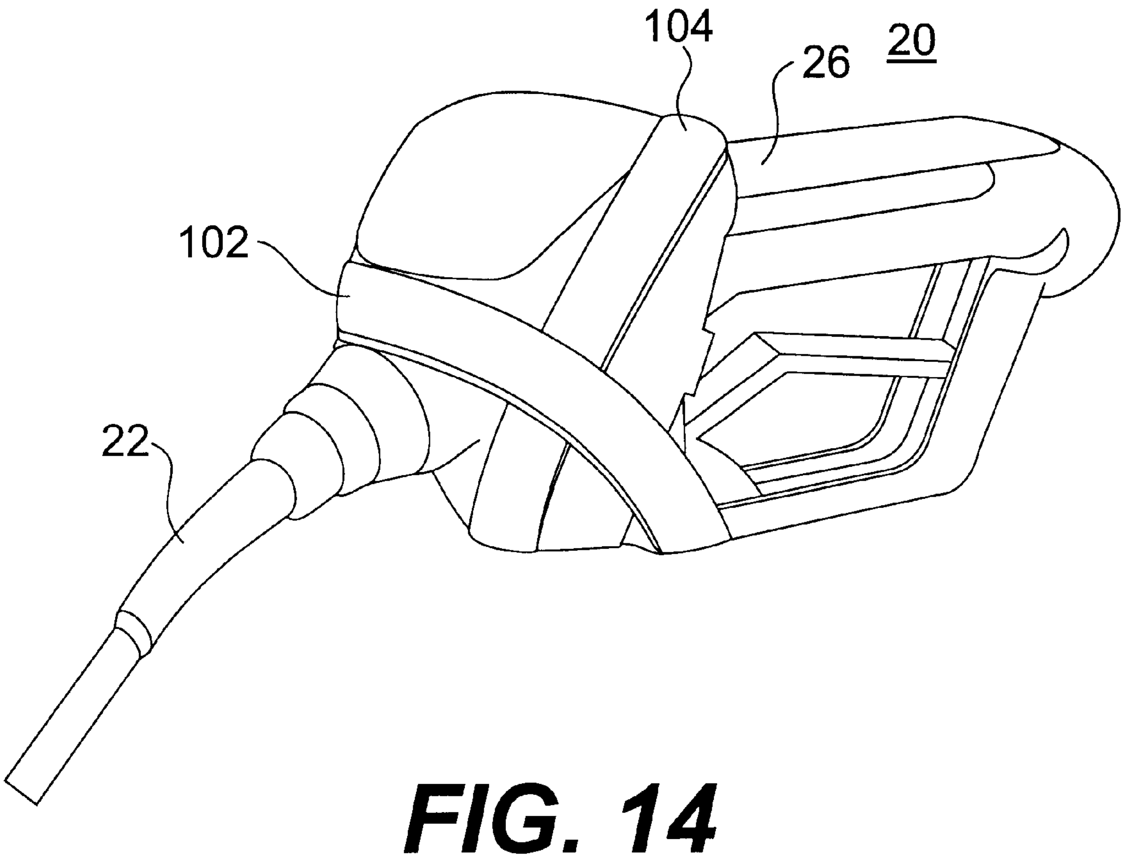
FIG. 14 is a perspective view depicting a variation on the embodiment shown in FIG. 13.

According to another embodiment, and referring to FIG. 13, the protective body 44 is divided into at least two parts 102, 104 configured to cover impact points on the filler gun 20, or to extend above the impact points. The filler gun 20 impact points are first to contact when the filler gun 20 is dropped at various angles. This embodiment offers the additional advantage of lighter weight and a lower cost. A variation on this embodiment of the invention is depicted in FIG. 14, in which parts 102 and 104 are disposed in a criss-cross configuration to cover impact points. Additional patterns are also possible.

Figure 15:
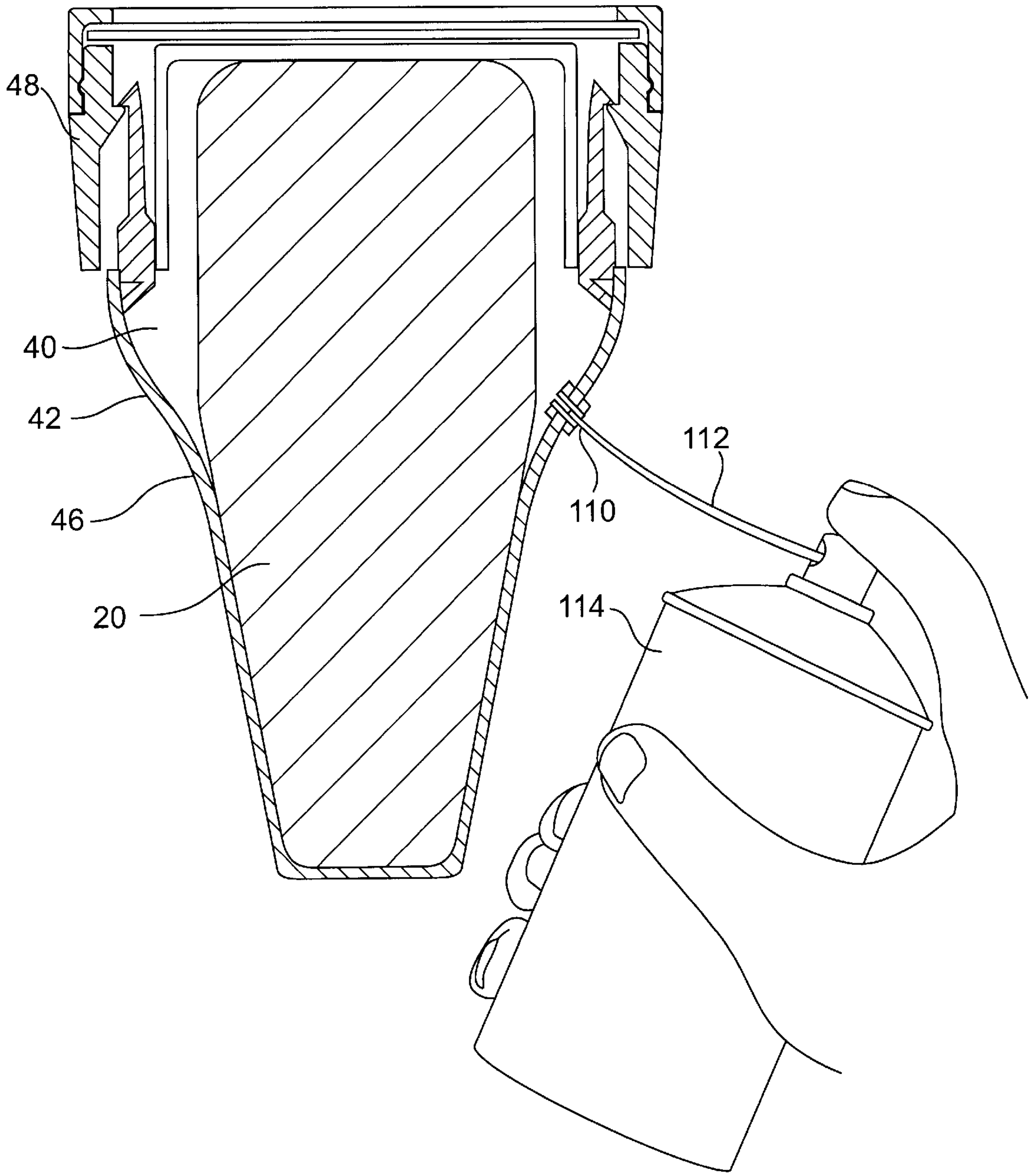
FIG. 15 depicts another embodiment of the invention including an aperture for applying the energy absorbing inner layer.

Another embodiment of the invention can be seen in FIG. 15. As embodied herein, fuel pump filler gun 20 is shown broadly in cross-section, surrounded by outer layer 42 and inner layer 40. In this embodiment, outer layer 42 includes lower member 46 and upper member 48. Lower member 46 is penetrated by a sealable aperture 110. Aperture 110 is provided to allow insertion of tube 112 of spray can 114. Spray can 114 preferably is filled with a foamed plastic material, which is sprayed beneath outer layer 42 to form the impact absorbing inner layer 40.

Figure 16:
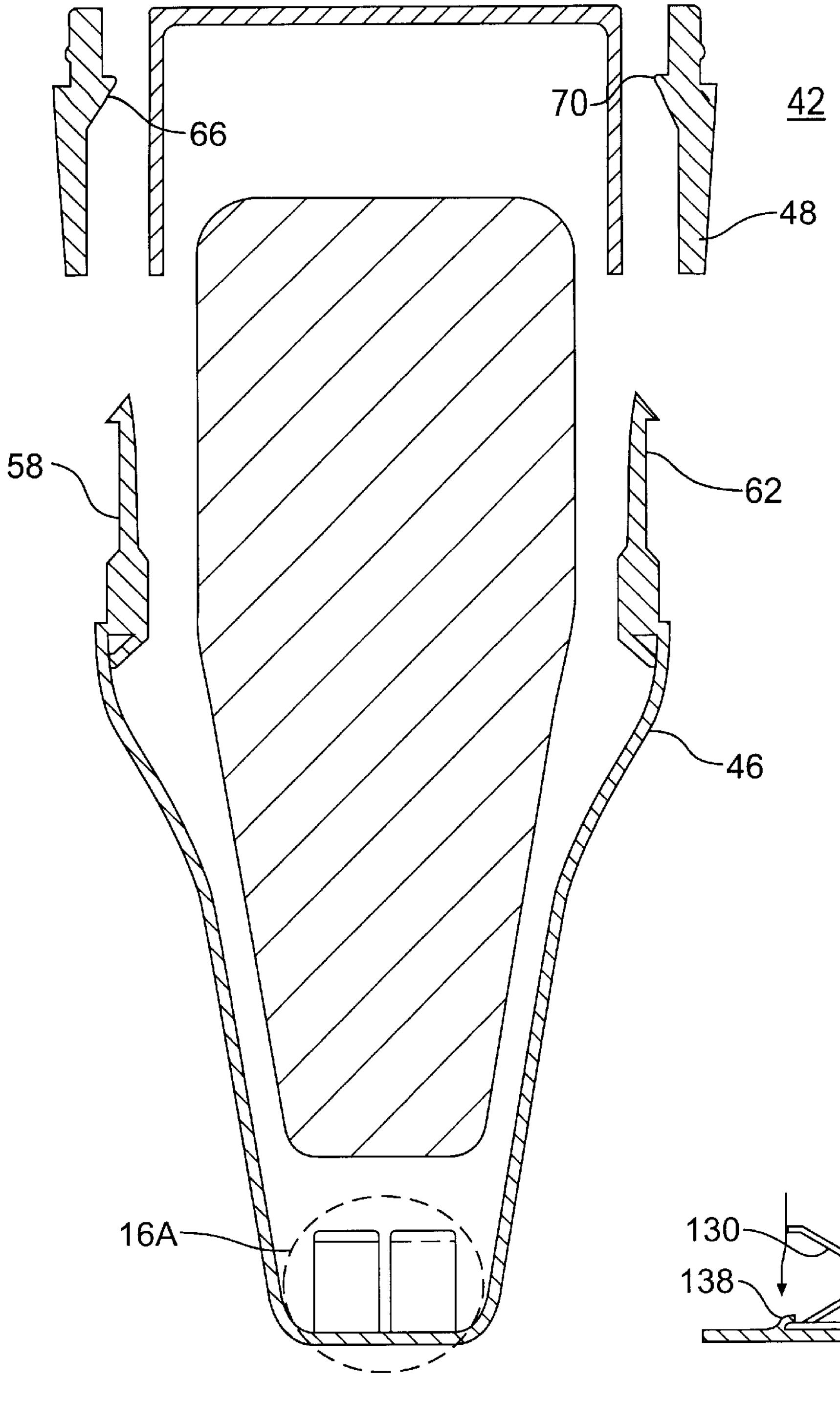
FIG. 16 is a cross-sectional front view of a filler gun and protective apparatus, with an enhanced section depicting a bottom spring in accordance with the invention.
Figure 16A:
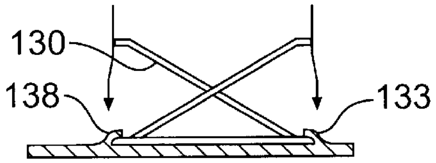

An alternative embodiment of the invention is depicted in FIG. 16. In addition to an outer shell configured to surround at least a portion of the filler gun and to distribute impact forces away from the filter gun, this alternative embodiment further comprises a spring disposed between the outer layer and the filler gun to absorb direct impacts to the outer shell.

As broadly embodied in FIG. 16, outer shell 42 includes lower member 46 and upper member 48, configured to be joined together by respective interlocking elements 62, 70, and 58, 66 (other interlocking elements not shown in FIG. 16).

Figure 17:
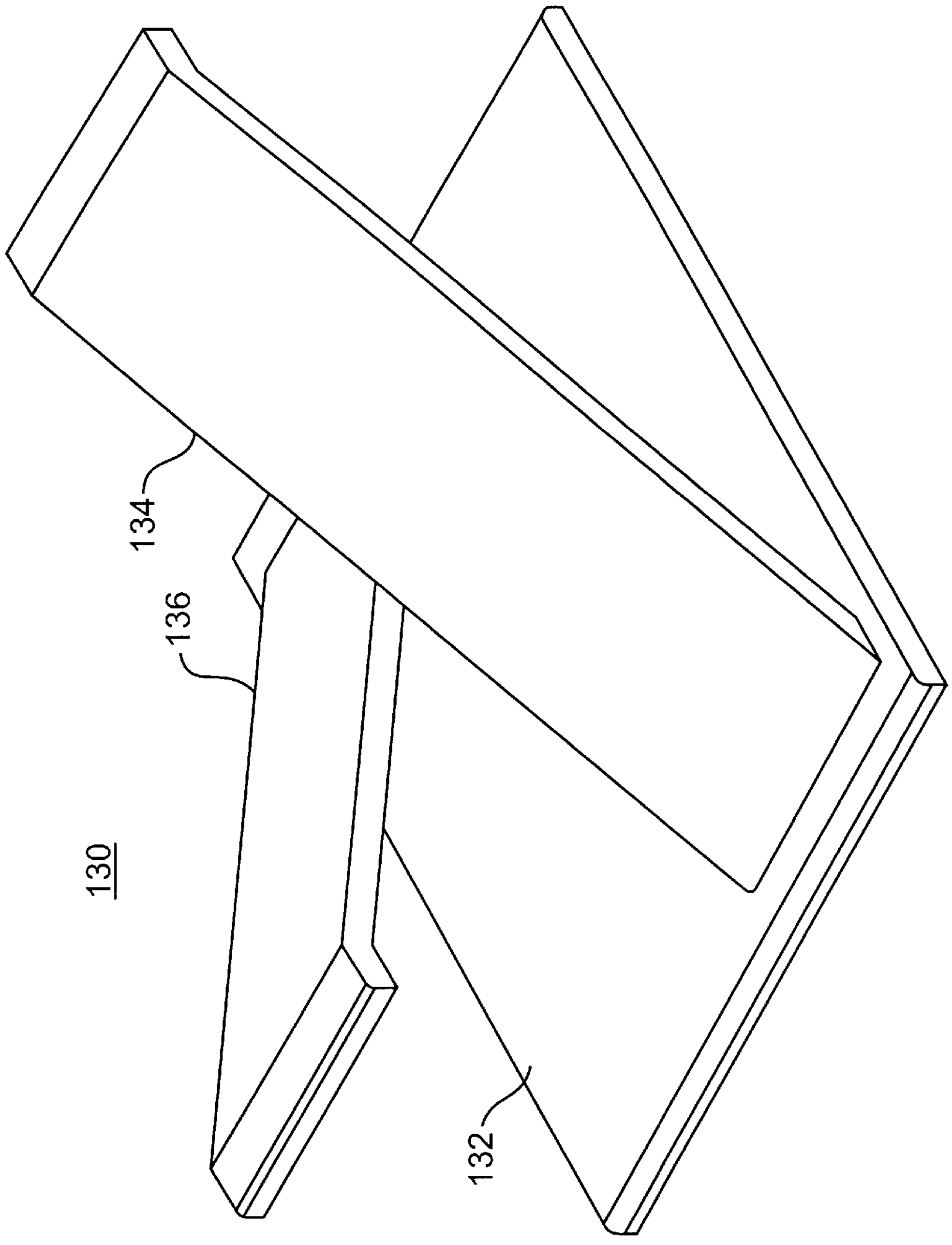
FIG. 17 is a perspective view of the bottom spring shown in FIG. 16.

A spring 130 is mounted between an inner surface of outer shell 42 and the filler gun. As shown in FIGS. 16 and 17, spring 130 includes a base portion 132 and resilient spring members 134 and 136. Lip portions 138 are molded into the inner surface of the outer shell to grip the base portion 132. As embodied in FIG. 16, spring 130 is provided in the bottom portion 46 of the outer shell. However, the invention is not limited to any precise position for the spring, or to any particular number of springs. Multiple springs can be provided at a plurality of locations.

In this embodiment, the outer shell 42 serves to broadly distribute impact forces and to protect the filler gun from scratches and the like. Spring 130, on the other hand, is provided to resiliently absorb direct impacts, such as point loads or blows, that might otherwise damage the outer shell and the filler gun.

Figure 18:
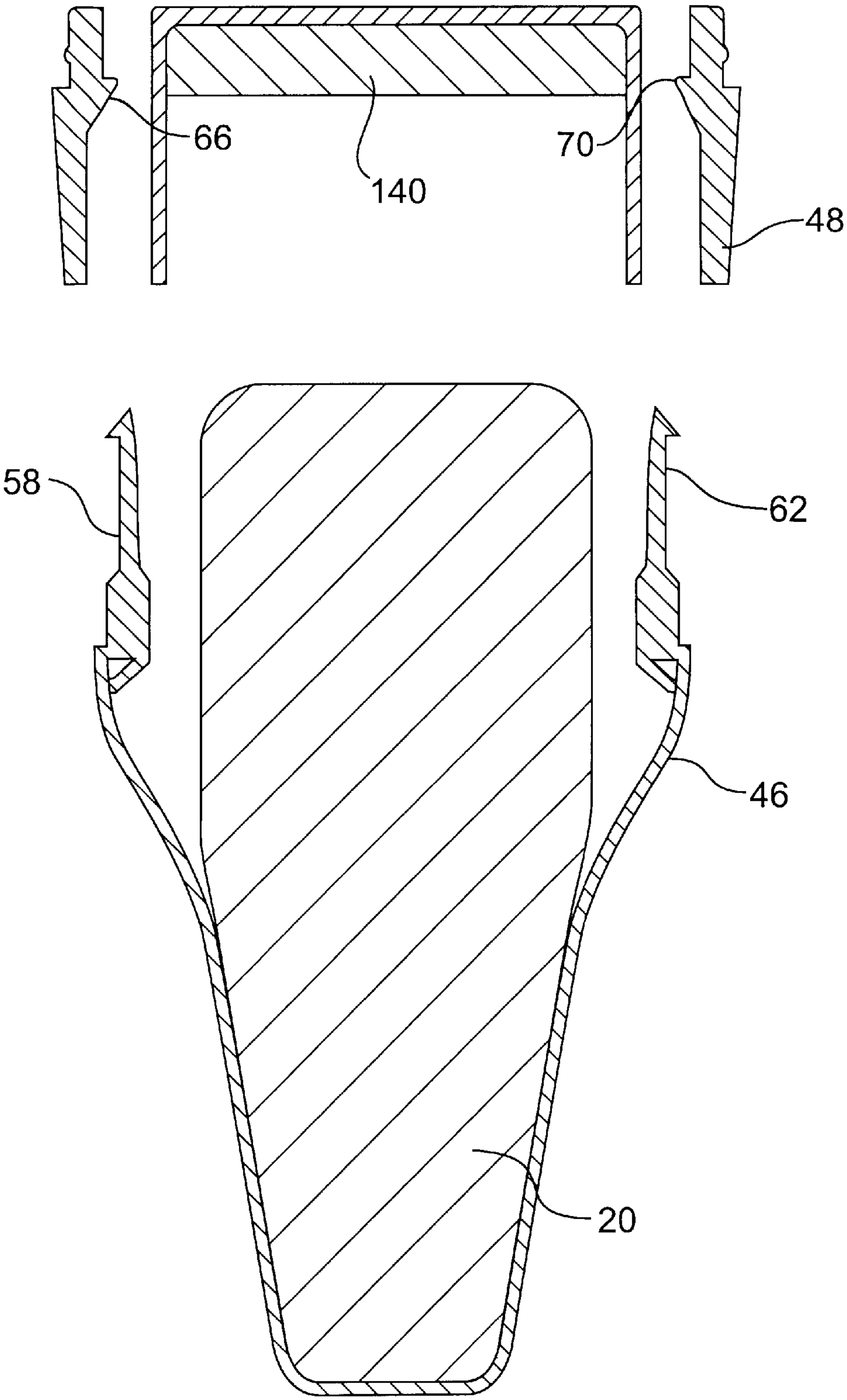
FIG. 18 is a cross-sectional front view of a filler gun and protective cover, depicting a "mattress" protective pad in the upper section of the protective cover.

FIG. 18 depicts yet another embodiment of the present invention. In this embodiment, inner layer 40 includes an upholstery material or mattress pad 140 provided inside the upper portion 48 of the outer shell.

Figure 19A:
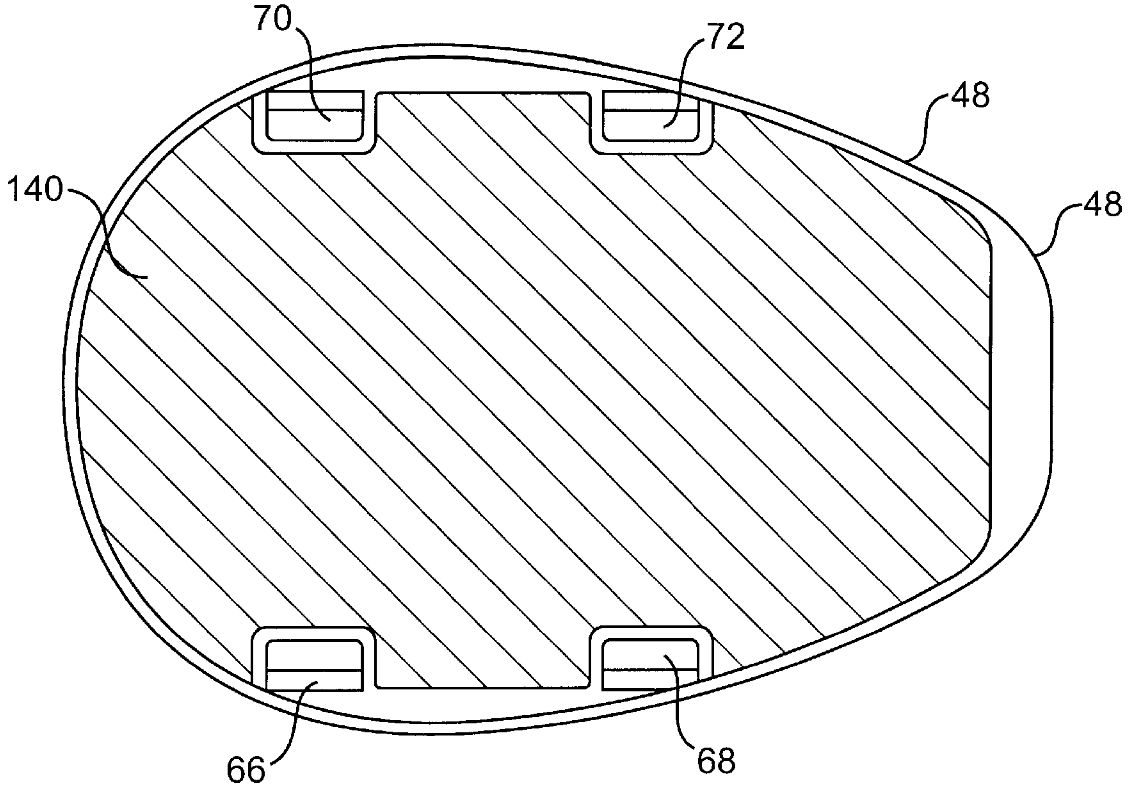
FIG. 19A is a bottom view of the "mattress" protective pad provided in the upper section of the protective cover shown in FIG. 18.
Figure 19B:
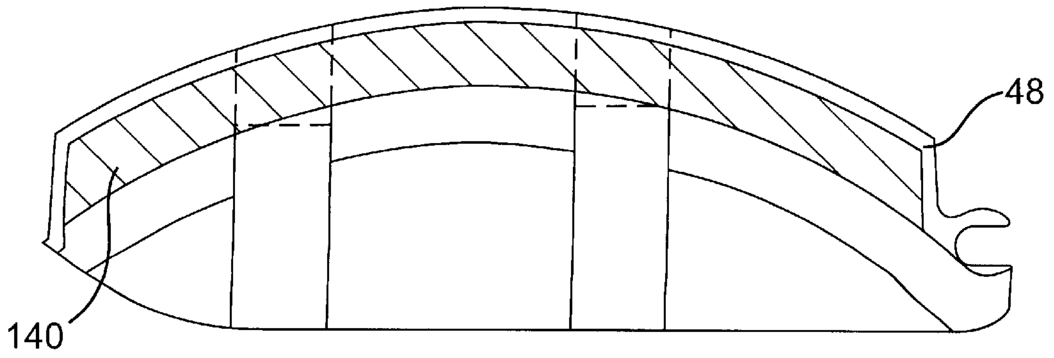
FIG. 19B is a cross-sectional side view of the upper section and "mattress" protective pad shown in FIG. 19A.

Referring to FIGS. 19A and 19B, and as discussed above, upper member 48 is formed as a generally arcuate and oval-shaped cap to fit over the upper part of gun head 24. Upholstery material 140 is attached to the inner surface of upper member 48 to have the same arcuate and generally oval configuration as the upper member.

Figure 20:
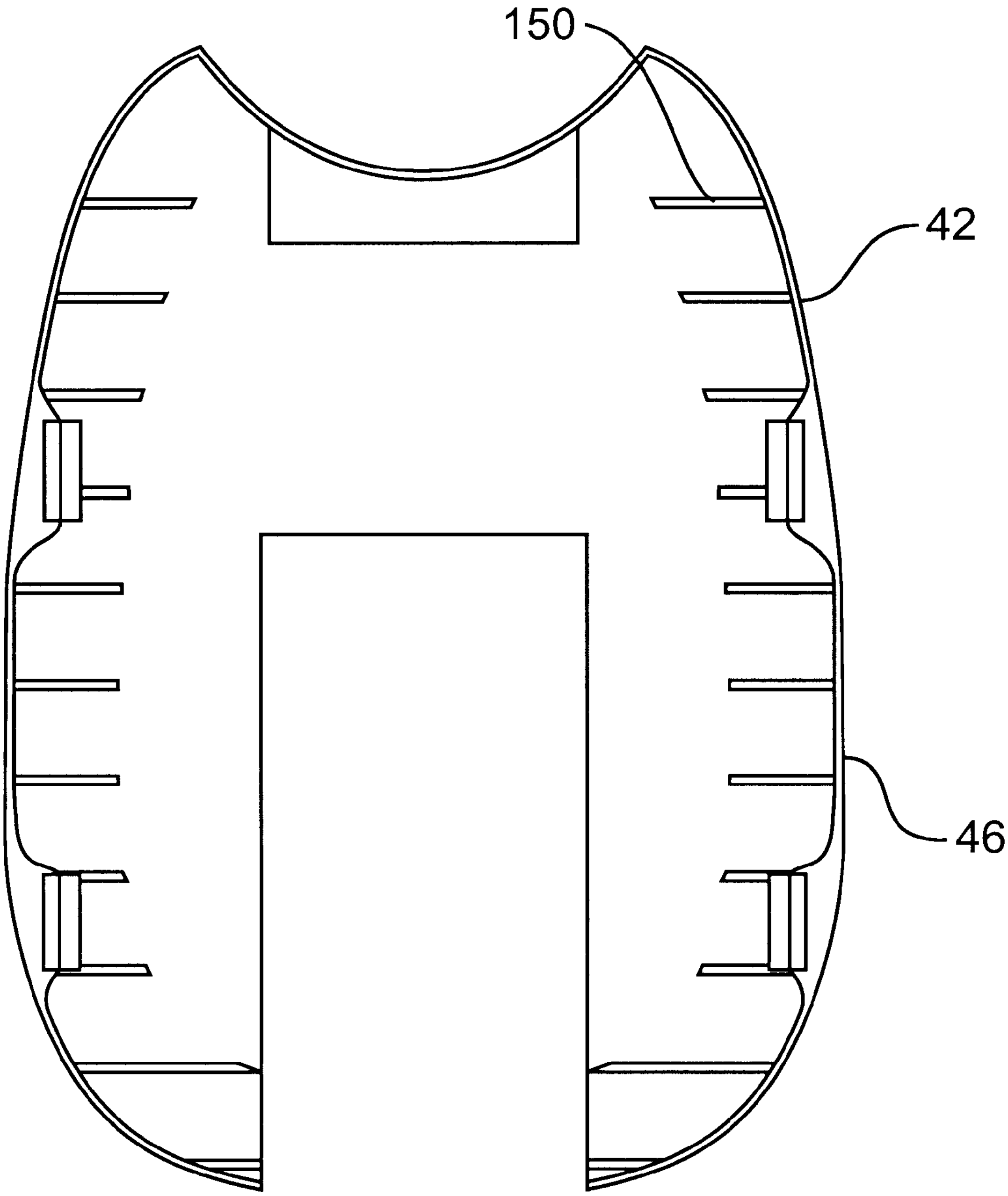
FIG. 20 is a top view of a lower portion of a protective shell, depicting yet another embodiment of a protective cover including a series of ribs.
Figure 21:
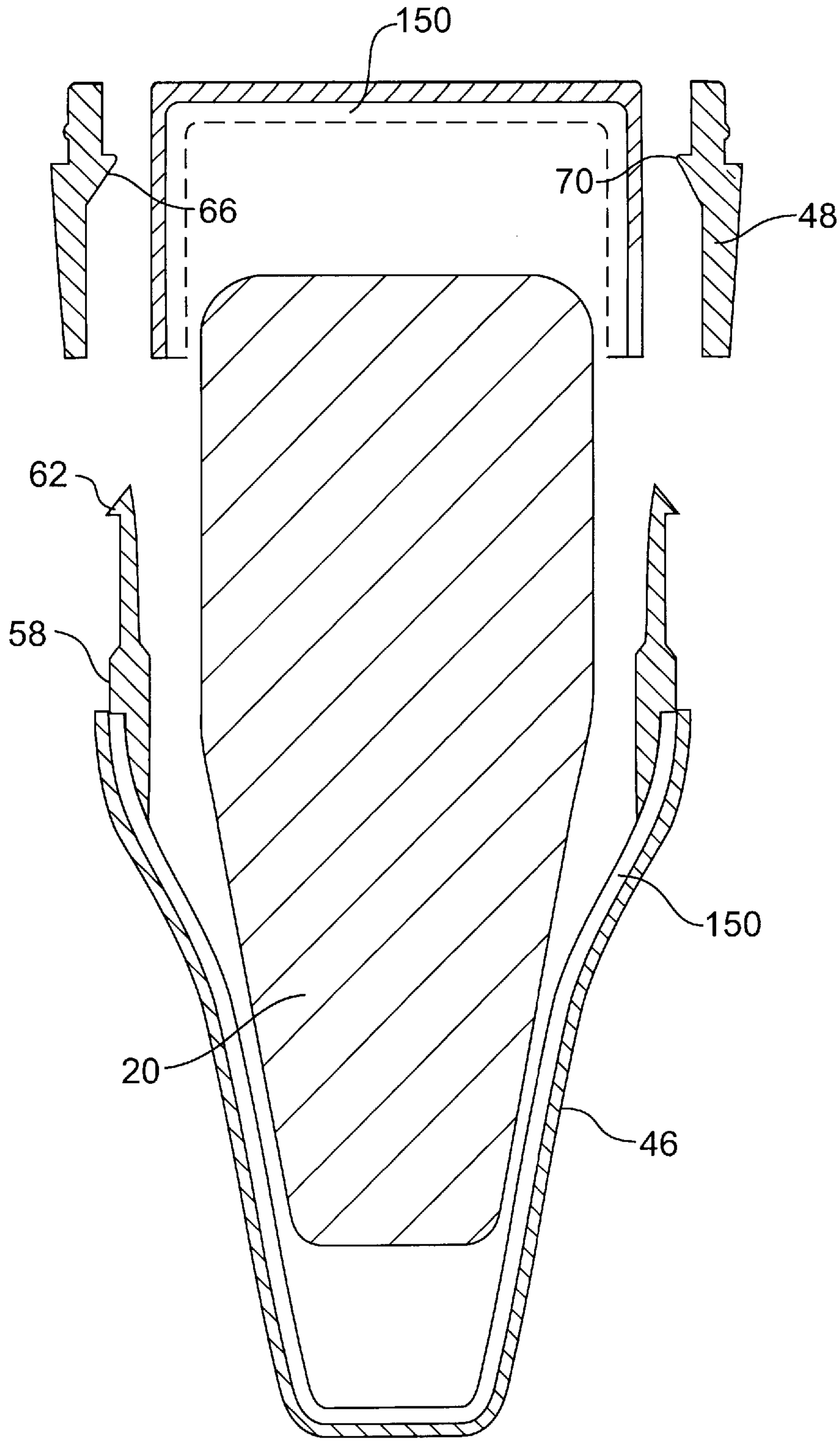
FIG. 21 is a cross-sectional front view of the ribbed embodiment of FIG. 20.

Yet another embodiment of the invention is depicted in FIGS. 20 and 21. In this embodiment, in addition to an outer shell configured to surround at least a portion of the filler gun and to distribute impact forces away from the filler gun, a plurality of ribs are provided extending away from an inner surface of the outer shell toward the filler gun.

Figure 22:
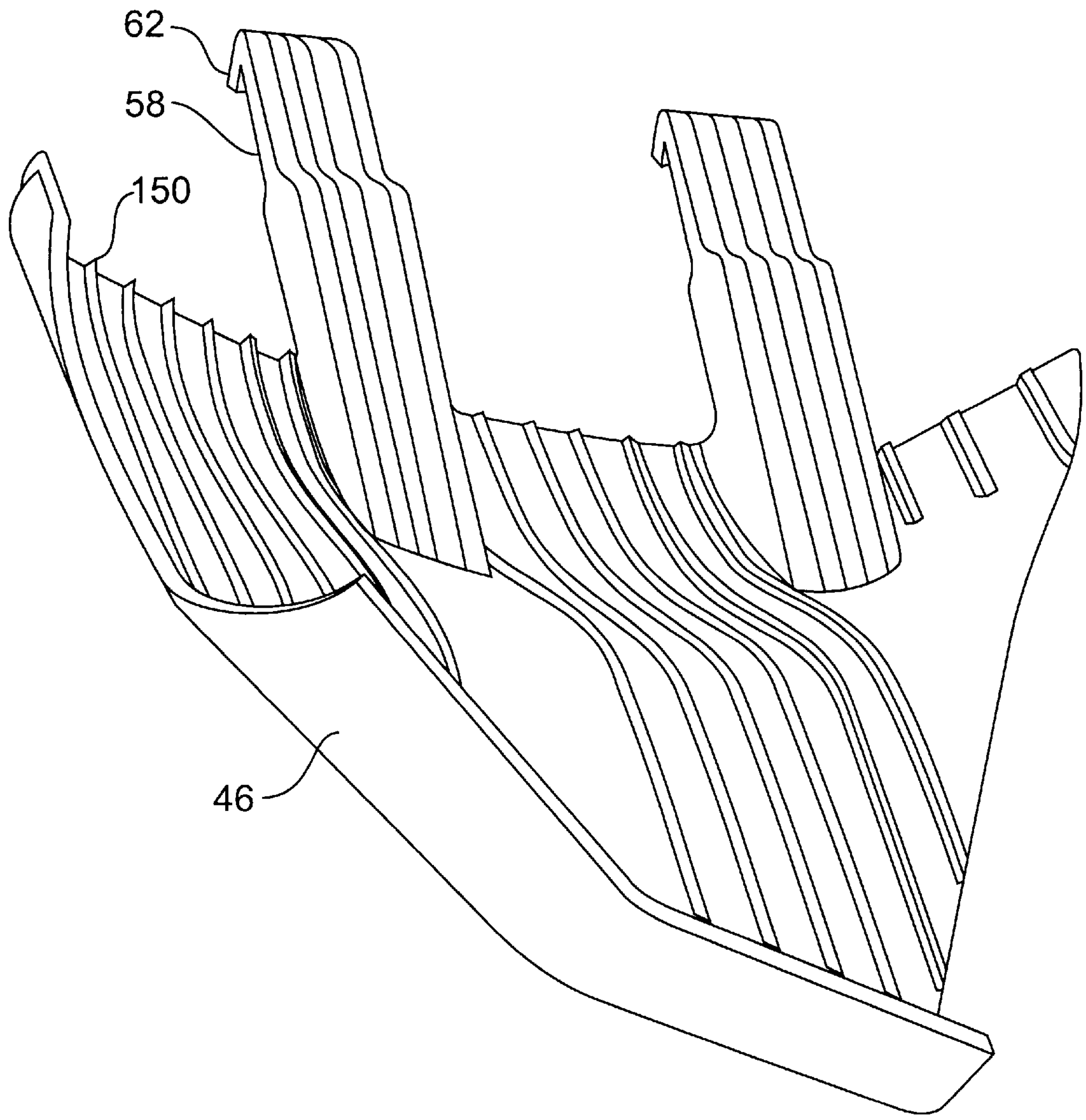
FIG. 22 is a perspective view of the lower portion of a protective shell as shown in FIG. 20.
Figure 23:
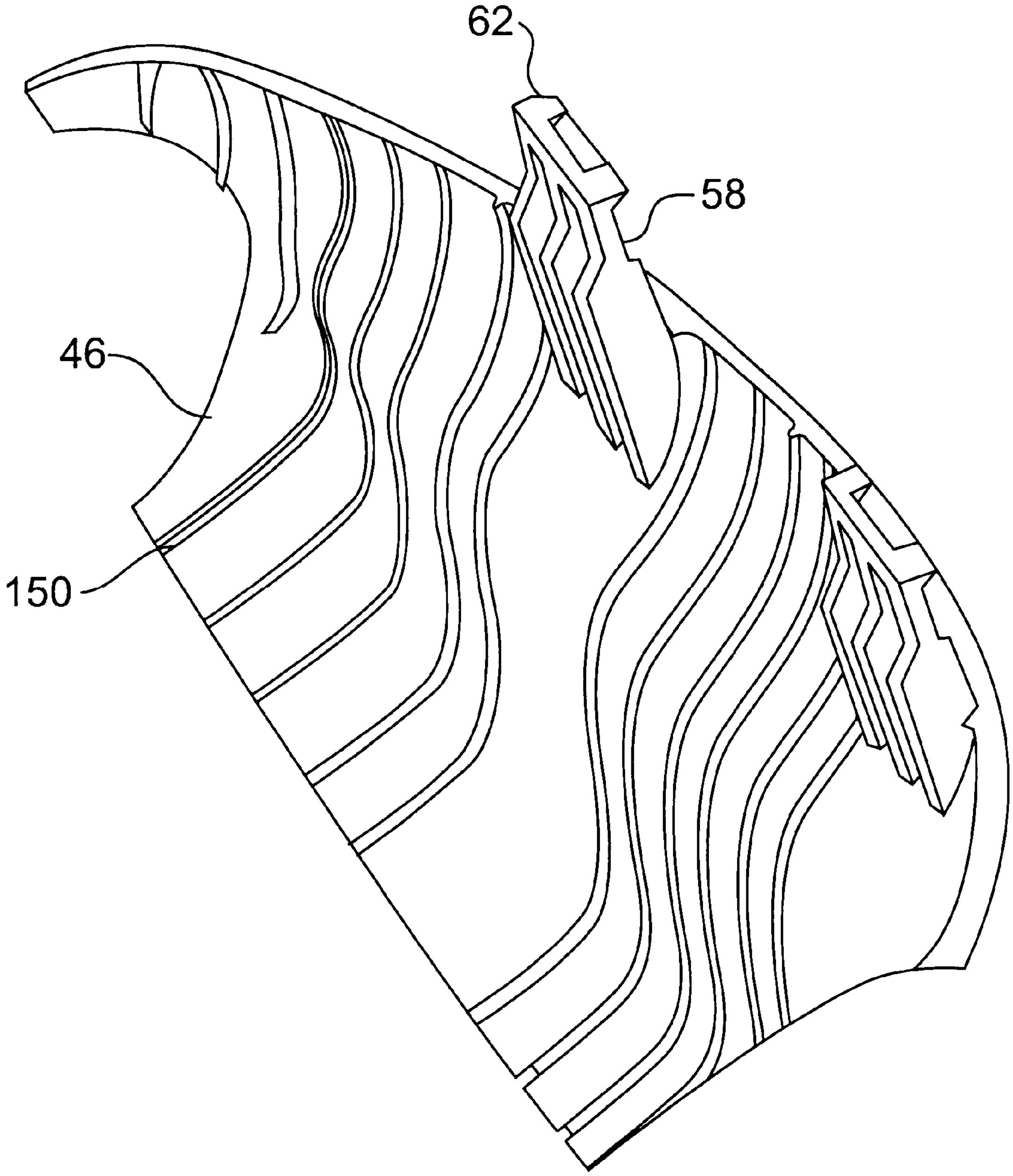
FIG. 23 is another perspective view of the embodiment shown in FIG. 22.

As broadly embodied in FIG. 20, a plurality of ribs 150 project away from the inner surface of the lower portion 46 of outer shell 42. Ribs 150 preferably are molded of the same material as outer shell 42. Alternatively, ribs may be molded separately and inserted, although this option is less practical. The ribs 150 serve multiple purposes. First, the ribs serve to assist the outer shell in absorbing and distributing impact forces away from the filler gun. Second, the ribs serve to strengthen and support the outer shell 42. Finally, the ribs can serve to position the outer shell correctly around the filler gun, by acting as spacers between the filler gun and the outer shell. As shown in FIG. 20, the ribs 150 may have different lengths, in order to work with filler gun heads of different sizes. Also, a wall thickness of the ribs will determine the "softness" of the ribs when the outer shell is subjected to an impact. In the embodiments of FIGS. 20, 22, and 23, ribs 150 extend over a substantial part of the lower portion 46. Referring to FIG. 21, ribs 150 also can be provided on the upper portion 48, although this is not required in all cases.

In another aspect of the invention, an apparatus for protecting a fuel pump filler gun includes an outer shell configured to surround at least a portion of the filler gun and to distribute impact forces away from the filler gun, and a plurality of energy-absorbing pads disposed between the outer shell and the filler gun to absorb direct impacts to the outer shell.

Figure 24:
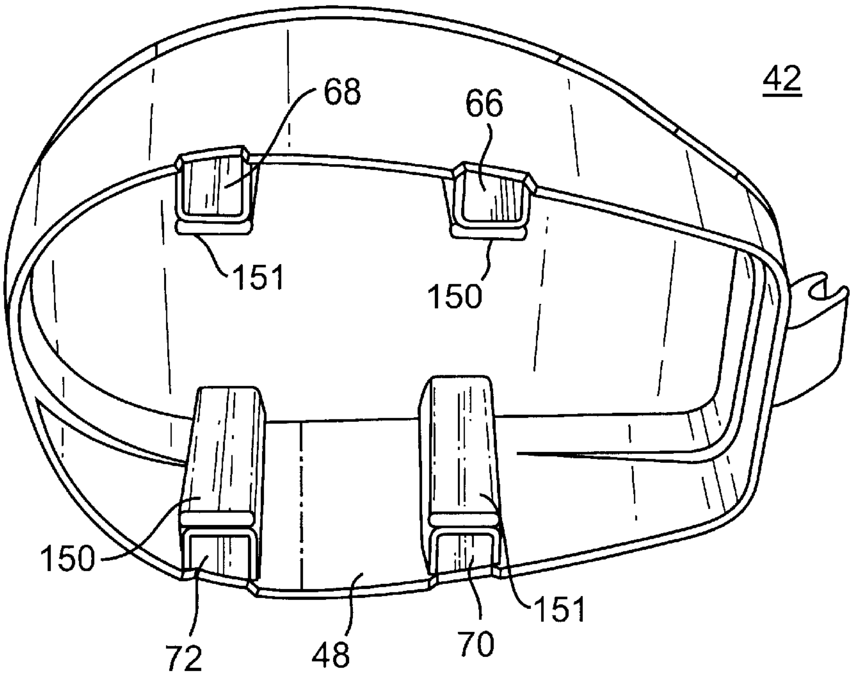
FIG. 24 is a perspective view of an upper portion of an outer shell having energy-absorbing pads on an inner surface thereof.
Figure 25:
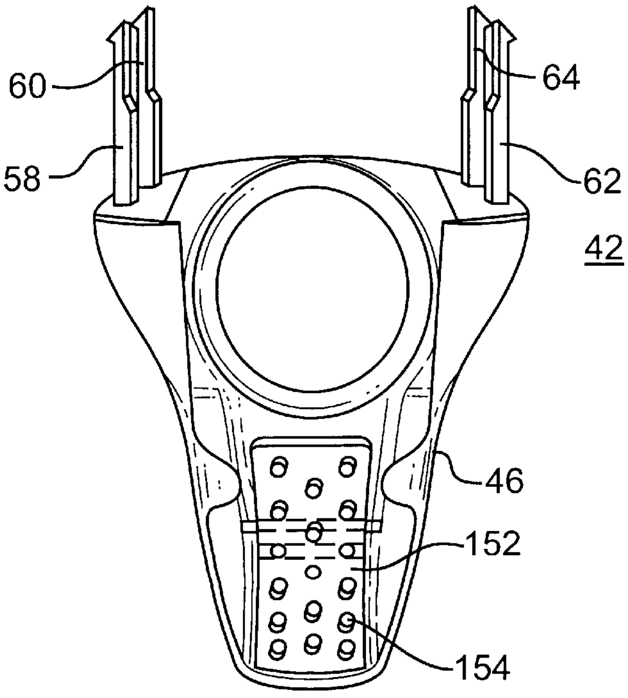
FIG. 25 is a partial end view of a louver portion of an outer shell having energy-absorbing pads on an inner surface thereof.
Figure 26:
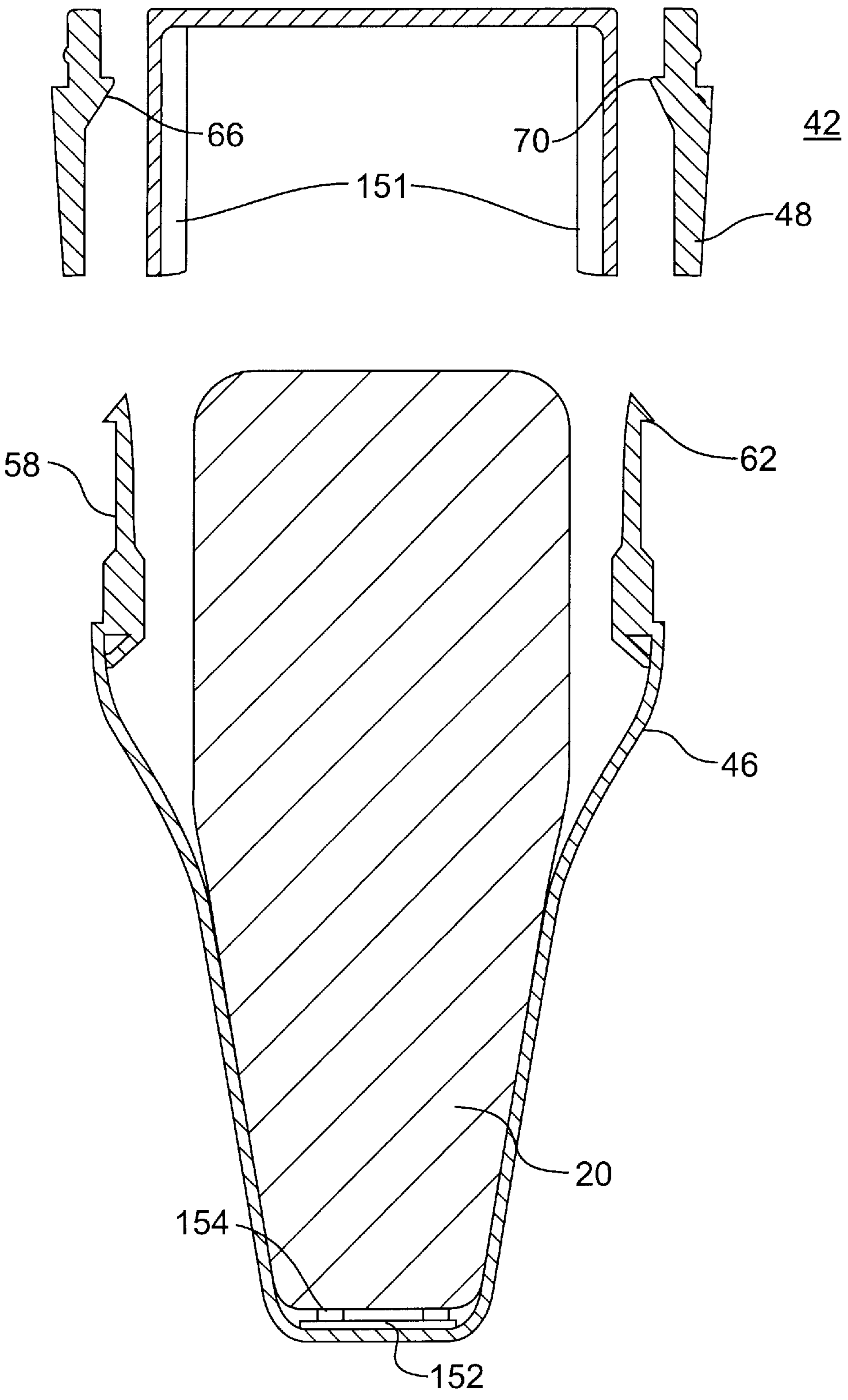
FIG. 26 is a cross-sectional front view of a filler gun and protective apparatus, depicting energy-absorbing pads in an upper and lower section of an outer shell.

As broadly embodied in FIGS. 24–26, protecting apparatus 38 comprises an outer shell 42, including a lower member 46 and an upper member 48. Upper member 48 is releasably engageable with lower member 46. A plurality of interlocking elements 58, 60, 62 and 64 project from lower member 46 as male elements in the form of snap hooks. A plurality of several interlocking elements 66, 68, 70 and 72 in the form of channels or female elements are provided in upper member 48. These channels preferably include ledges or set-offs. The upper member 48 and lower member 46 can be releasably engaged by insertion of the snap hooks into the channels.

As broadly shown in FIG. 24, a plurality of energy-absorbing pads 151 are provided on the outer surfaces of the interlocking elements or channels 66, 68, 70 and 72 in upper member 48. These energy-absorbing pads 151 preferably are made of a soft, resilient material, such as soft plastic or rubber.

As broadly shown in FIG. 25, an energy-absorbing pad 152 is provided on a lower inner surface of lower member 46. Energy absorbing pad 152 also preferably is made of soft, resilient plastic or rubber. Furthermore, it is preferred that energy absorbing pad 152 have a corrugated surface comprising a plurality of protruding elements or knobs 154.

The energy absorbing pads 151 and 152 provided on the inner surface of the outer shell 42 absorb energy applied to and distributed over the outer shell, thereby preventing damage to the filler gun. Preferably, the energy-absorbing pads are strategically placed at the primary impact points between the outer shell 42 and the filler gun head. Accordingly, the filler gun head can be protected without having an inner layer on the entire inside surface of the outer shell. The knobs 154 on energy-absorbing pad 152 provide additional resilience to this pad, and increased impact protection to the filler gun head.

A method for protecting a fuel pump filler gun according to the present invention comprises the steps of: surrounding at least a portion of the filler gun 20 with an outer shell 42 to distribute impact forces away from the filler gun 20; and disposing a spring 130 between the outer shell 42 and the filler gun 20 to absorb direct impacts to the outer shell. The step of disposing preferably includes attaching the spring 130 to the outer shell 42.

In accordance with another method of the present invention, the method comprises the steps of: surrounding at least a portion of the filler gun 20 with an outer layer 42; and filling a space between the outer layer 42 and the filler gun 20 with a foamed material to form an impact absorbing inner layer 40. The step of filling preferably includes spraying the foamed material. The method may further comprise the step of inserting a tube 112 for moving the foamed material through the outer layer 42 and into the space between the outer layer 42 and the filler gun 20 prior to the step of spraying. The step of surrounding preferably includes providing the outer layer 42 with a sealable operative 110 for receiving the tube 112. The method may further comprise the step of removing the tube 112 from the outer layer 42 after the step of spraying.

In accordance with another aspect of the present invention, the method comprises the steps of: surrounding a portion of the filler gun head with an outer shell 42; ard providing a plurality of energy-absorbing pads 151 and 152 at selected locations on the inner surface of the outer shell.

While there has been illustrated and described what is at present considered to be a preferred embodiments of the present invention, it will be understood by those skilled in the art that various changes and modifications may be made, and equivalents may be substituted for elements thereof, without departing from the true scope of the invention. Therefore, it is intended that this invention not be limited to the particular embodiments disclosed herein, but that the invention include all embodiments falling within the scope of the appended claims.

What is claimed is:

1. An apparatus for protecting a fuel pump filler gun from impacts, the filler gun including in sequence a barrel, a head portion, and a handle, the apparatus comprising:

an outer shell configured to substantially surround the head portion of the filler gun and to distribute impacts away from the head portion of the filler gun, the outer shell having a tapered front end with an opening configured such that the barrel can project therethrough, an expanded middle portion substantially covering the head portion, and a rear end with an opening configured such that the handle can project therethrough; and an energy absorbing pad disposed between the outer shell and the filler gun to absorb direct impacts to the outer shell.

2. The apparatus of claim 1, wherein the outer shell includes an upper portion and a lower portion, and means to connect the upper portion and the lower portion.

3. The application of claim 2, wherein said pad is disposed in the lower portion of the outer shell.

4. The apparatus of claim 3, wherein said at least one pad has on the side thereof facing the filler gun a corrugated surface formed by protruding elements.

5. The apparatus of claim 2, wherein a plurality of energy absorbing pads are disposed between the outer shell and the filler gun and at least two of the pads are attached to the inner surface of the upper portion of the outer shell.

6. The apparatus of claim 1 wherein the outer shell is made of molded plastic.

7. The apparatus of claim 1 wherein the outer shell is made of a substantially hard plastic.

8. The apparatus of claim 7, wherein said hard plastic is polyamide.

9. The apparatus of claim 7 wherein said hard plastic is polycarbonate.

10. The apparatus of claim 1, wherein said pad is made of a soft, resilient material.

11. The apparatus of claim 1, further comprising means for releasably attaching the outer shell to the fuel pump filler gun.

12. A method of protecting a fuel pump filler gun from impacts comprising the steps of:

providing the fuel pump filler gun, including in sequence a barrel, a head portion, and a handle;

substantially surrounding the head portion of the filler gun with an outer shell to distribute impacts away from the filler gun, the outer shell configured such that the barrel projects out of an aperture in a tapered front end, a middle section expands to substantially surround the head portion, and the handle projects out of an aperture in a rear end; and disposing an energy-absorbing pad at a selected location between the outer shell and the filler gun.

13. The method of claim 12, wherein the step of disposing includes the step of attaching the at least one energy-absorbing pad to the outer shell.

14. The method of claim 12, wherein the step of surrounding includes the step of providing an outer shell having an upper portion and a lower portion, and means to connect the upper portion and the lower portion.

15. The method of claim 14, wherein the step of disposing includes attaching at least one energy-absorbing pad to each of the upper portion and the lower portion of the outer shell.

* * * * *